July 13, 1943.  F. R. HOOP  2,324,395
BEVERAGE MAKING MACHINE AND PROCESS
Filed March 6, 1941  6 Sheets-Sheet 3

Inventor
Fred R. Hoop
By Livermore
and
Van Antwerp
Attorneys

July 13, 1943.   F. R. HOOP   2,324,395
BEVERAGE MAKING MACHINE AND PROCESS
Filed March 6, 1941   6 Sheets-Sheet 6

Inventor
Fred R. Hoop
Attorneys

Patented July 13, 1943

2,324,395

UNITED STATES PATENT OFFICE 2,324,395

BEVERAGE MAKING MACHINE AND PROCESS

Fred R. Hoop, Grand Rapids, Mich., assignor to Froid Laboratories, Inc., Grand Rapids, Mich., a corporation of Michigan Application March 6, 1941, Serial No. 382,041

11 Claims. (Cl. 62—114)

This invention relates to a machine for automatically producing a semi-liquid beverage. In its preferred form the product is semi-frozen and of thick consistency so that it may either be drunk or eaten with a spoon. The consistency of the product however, may be varied by varying the degree of coldness to which it is submitted and by varying the ingredients of the mixture.

The invention has for its objects the continuous automatic mixing and cooling or freezing of ingredients in predetermined proportions and delivering the finished product. It provides means for continuous operation as long as desired or for intermittent operation for any desired length of time.

Means are provided to preserve the contents of the machine in good condition during idle periods so that they may be instantly delivered when desired.

The machine provides means for easy cleaning or washing and disassembly and means for rendering part of the cooling system inoperative for the purpose of cleaning.

Means to automatically maintain the desired temperature are provided including means for lowering the temperature during operation and for automatically raising the temperature during idle periods.

The machine provides improved cooling and delivering mechanism and freezer construction and improved water cooler construction.

An improved powder measuring and feeding and water measuring and delivery apparatus are provided.

The invention provides various other novel features of construction and arrangement hereinafter more fully described and particularly pointed out in the claims, reference being had to the accompanying drawings, in which

Like reference characters refer to like parts in all of the figures.

General description

The machine has been especially designed to use a powder containing different ingredients to be mixed with water and to produce a product resembling what is generally known as "malted milk" or in other words a flavored malted milk product but the product made by this machine differs from the ordinary product in that it is considerably thickened and aerated. Both the ingredients of the powder and the action of the machine combine to produce the desired consistency. The product is semi-frozen and therefore must remain in the freezing cylinder for a considerable period after the ingredients are first introduced and mixed to arrive at that semi-frozen state and the machine has been carefully designed both as to structure and operation and maintenance of the proper temperature so that a uniform product of the desired consistency is always delivered from the machine.

The machine comprises a freezing cylinder 1 into which powder and cooled water are deposited in automatically measured quantities at one end of the cylinder and delivered as the finished product from the other end of the cylinder. The hopper 2 contains the powder which is fed into the cylinder by an automatic feeding and measuring device and a water pump 3 automatically pumps and measures water and deposits it into the cylinder 1 along with the powder. The water delivered from the pump 3 passes through the pipe 4, before entering the freezing cylinder, into the water cooler 5 where it is cooled to a uniform temperature and from where it is delivered through the pipe 6 to the freezing cylinder 1.

Both the freezing cylinder and water cooler are cooled by an electric refrigerating system which comprises the conventional compressor 7, the condenser 8, and the liquid receiver 9. Compressed liquid refrigerant passes through the pipe 10 and the branch 11 thereof to the water cooler 5 and through the branch 12 to the freezing cylinder 1. The entrance of the compressed refrigerant to the water cooler and freezing cylinder is controlled by suitable conventional means (not shown) such as a restricted passage or a float valve or a thermostatically actuated expansion valve, these means of controlling the entrance of compressed refrigerant into the expansion coils being well known to those skilled in the art.

The temperatures of the water cooler and freezing cylinder are controlled by thermostatically actuated electric switches 13 and 14 respectively which in turn actuate valves 15 and 16 in two outlet pipes 19 and 20 which return the evaporated refrigerant from the cooling device through the compressor 7.

It is desired to clean the freezing cylinder at intervals and for that purpose provision is made to shut off the entrance of refrigerant to the cylinder coil and also to stop the flow of evaporated refrigerant therefrom. To accomplish this an electrically actuated shut off valve 21 is placed in the supply pipe 12. This valve 21 is supplied with current through a manual switch 22 and when the switch 22 is opened to break the circuit of the valve 21 it automatically closes. The manual switch 22 also controls the circuit to the switch 14 which controls the temperature of the freezing cylinder by actuating the valve 16 and the switch 14 is also made ineffective by opening the switch 22 causing the valve 16 to remain closed.

However to avoid undue pressure accumulating in the cooling coils of the cylinder 1 when both the inlet valve 21 and the outlet valve 16 are closed a pressure actuated switch 23 is provided connected with the outlet pipe 19 ahead of the valve 16 and is electrically connected with the valve 16 so that pressure above a predetermined point will act to open the valve 16 and relieve the pressure through the return pipe 19.

For washing purposes a water pipe 24 provided with a hand operated valve 25 leads to the interior of the cylinder 1 and supplies uncooled or warm water for cleaning purposes.

*Specific description*

The freezing cylinder 1 has its inner end permanently closed by a head 30 and its outer end closed by a removable head 31. A drive shaft 32 enters the cylinder through its head 30 where it is connected with the mixer shaft 33 on which are mounted mixing devices hereafter explained.

An entrance spout 34 leads upwardly from the inner end of the cylinder 1 and communicates with the powder hopper 2 which is located above it. The powder hopper is preferably of cylindrical form and has a bottom 35 in which is an outlet opening 36 communicating with the entrance spout 34. Directly above the bottom 35 is a rotatable disk 37 having a series of notches 38 in its periphery. The notches 38 successively register with the opening 36 as the disk is rotated.

A housing 39 is located above the disk 37 at its periphery and a spur wheel 40 is mounted to rotate in the housing 39. The spur wheel 40 is provided with spurs or short cylindrical projections 41 which successively enter the notches 38 as the wheel rotates causing the disk 37 to rotate and also pushing powder from the notches 38 through the opening 36 from where it drops through the spout 34 into the rear end of the cylinder 1.

The hopper 2 contains powder and to prevent caking of the powder so that it will not enter the notches 38 an agitating device is provided which comprises an agitator 42 having a series of arms extending radially and resting upon the upper surface of the disk 37. This agitator 42 is formed as a part of the housing 39 and is pivoted at the axis of the disk 37. A vertical groove 45 is formed in the inner face of the housing 39 and a roller 46 mounted eccentrically on the spur wheel 40 traverses the groove 45 and as the wheel rotates the housing 39 and agitator 42 are caused to oscillate.

A stirring device in the nature of a spoked wheel 47 is located above the agitator 42 and rotates with the disk 38. A stud 48 enters through the bottom 35 of the hopper and projects slightly above it and serves as an axis about which the disk 37 rotates, said disk having a slotted hub 49 attached to it. The agitator 42 has a central opening which receives the hub 49 of the disk 38 and the spoked wheel 47 has a hub 50 with a pin 51, the hub 50 passing over the upper end of the hub 49 and the pin 51 entering the slot in the hub 49 which causes the wheel 47 to rotate with the disk 37.

Figures 2, 16:
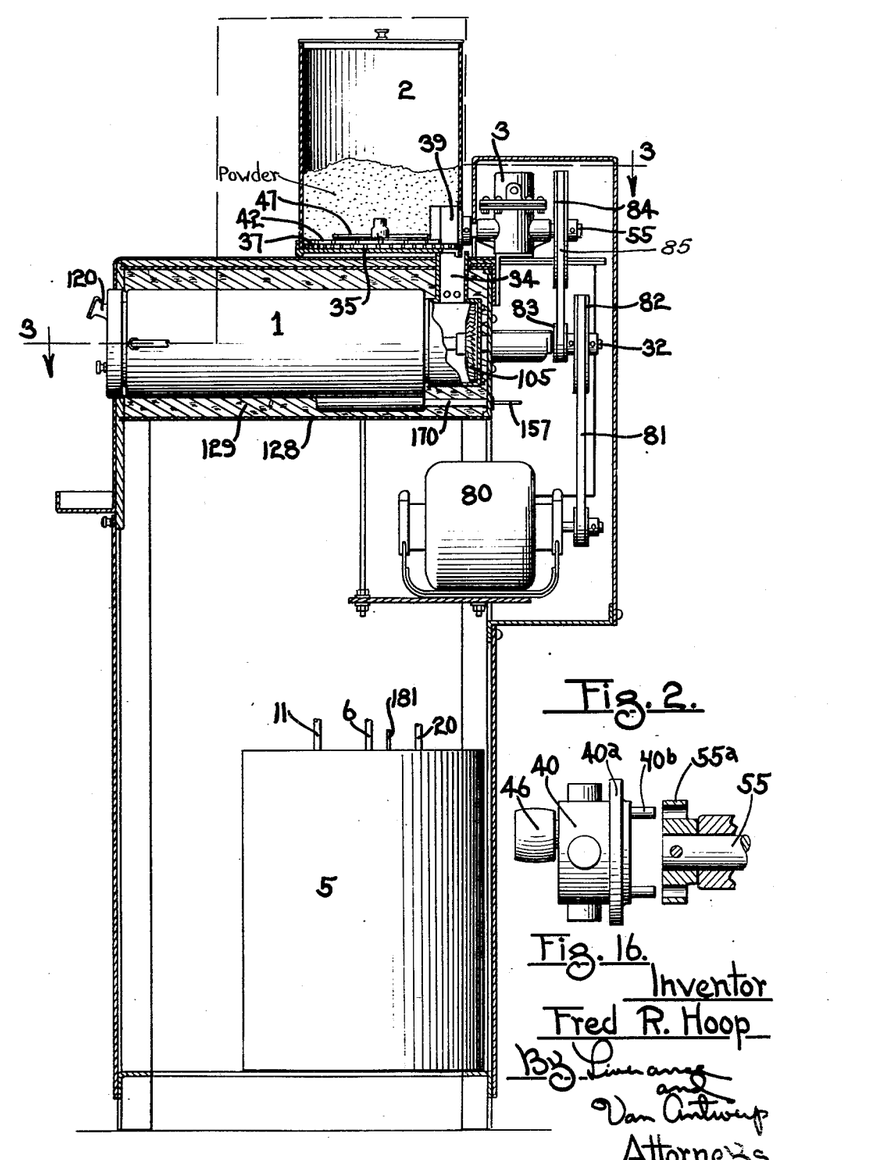
Fig. 2 is a vertical section of the machine with conventional parts eliminated.
Fig. 16 is a fragmentary elevation, partly in section, showing the detachable connection between the pump shaft and the powder feed.

The spur wheel 40 has a flange 40a (Fig. 2) which is detachably connected by means of pins 40b to a drive disk 55a on a shaft 55 for the water pump 3. The aforedescribed parts of the powder feed device may be easily disassembled for cleaning by simply lifting them apart. The mixing wheel 47 lifts from the hub 49 of the feeding disk 37. The agitator 42, including the housing 39, lifts from its support on the upper surface of the feeding disk 37. The spur wheel 40 lifts from its connecting pins 40b and the feeding disk 37 lifts off the stud 48. These parts are reassembled in the same simple manner. The fact that the spur wheel 40 is driven by the water pump shaft 55 insures synchronous action of the two devices which measure and feed the ingredients to the freezing cylinder 1.

The water pump 3 is of the diaphragm type having a diaphragm 56 forming one wall of a chamber 57 (Fig. 11) and moved by an eccentric 58 on the shaft 55 which is connected to the diaphragm by a connecting rod 59. Water is admitted to the chamber 57 through a pipe 60 and an inlet check valve 61 on one movement of the diaphragm and is emitted from the chamber 57 through the outlet check valve 62 on the opposite movement of the diaphragm from where it passes through the pipe 4 to the water cooler. The construction of this pump is conventional excepting that the eccentric 58 is adjustable to vary the amount of water delivered at each stroke. The eccentric 58 is adjustable rotatably upon an eccentric 63 which is fixed to the shaft 55, the eccentric 58 being retained in its adjusted position by means of a set screw 64.

In order to obtain water not under pressure to supply the pump a float chamber 65 (Fig. 12) is provided to which water is lead by a pipe 66 from a suitable source such as city water supply. The pipe 66 extends downwardly to near the bottom of the chamber 65 where it is provided with a cap 67 having an opening through it communicating with the end of the pipe. A housing 68 is attached to the cap 67 and contains a disk valve 69 which is actuated by a pin 70 extending through the housing. The housing 68 is provided with radial water outlet openings 68a.

Figure 12:
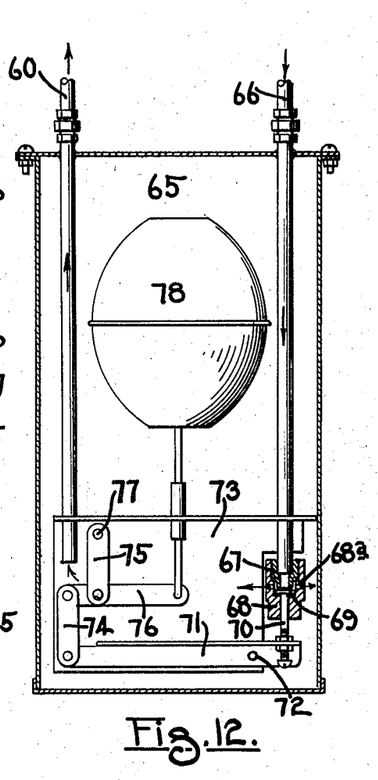
Fig. 12 is a sectional elevation of the water tank and float valve mechanism.

The pin 70 is mounted on a lever 71 which is pivoted at 72 to a plate 73 which forms a part of the frame of the device. Links 74 and 75 and a lever 76 are pivotally connected together and the link 75 is pivotally connected to the plate 73 at 77. This forms a compound leverage to operate the pin 70 against the disk 69 and this train of levers is actuated by a float 78 connected to the lever 76 so that when the float is raised by water in the chamber 65 to a predetermined height the disk valve 69 will close thereby maintaining a substantially constant water level in the chamber. The pipe 60 leading to the pump 3 extends to a point near the bottom of the chamber 65.

Figure 3:
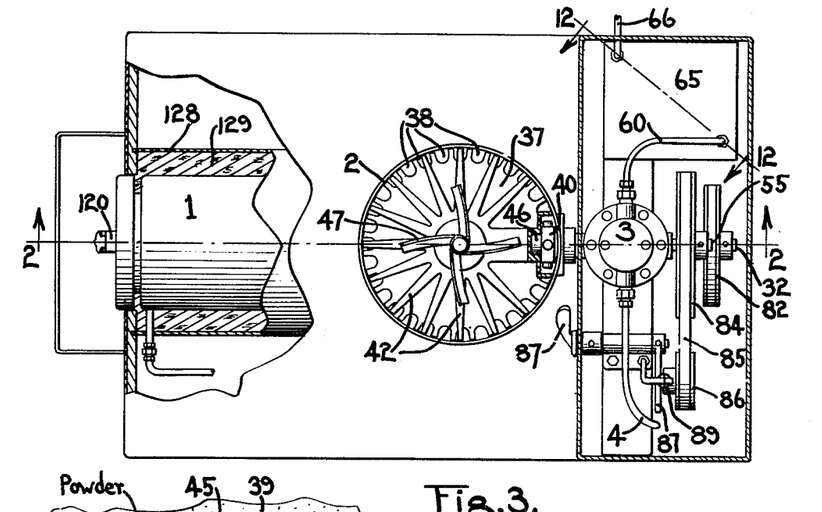
Fig. 3 is a sectional plan view of the machine on the line 3—3 of Fig. 2.
Figures 4, 5:
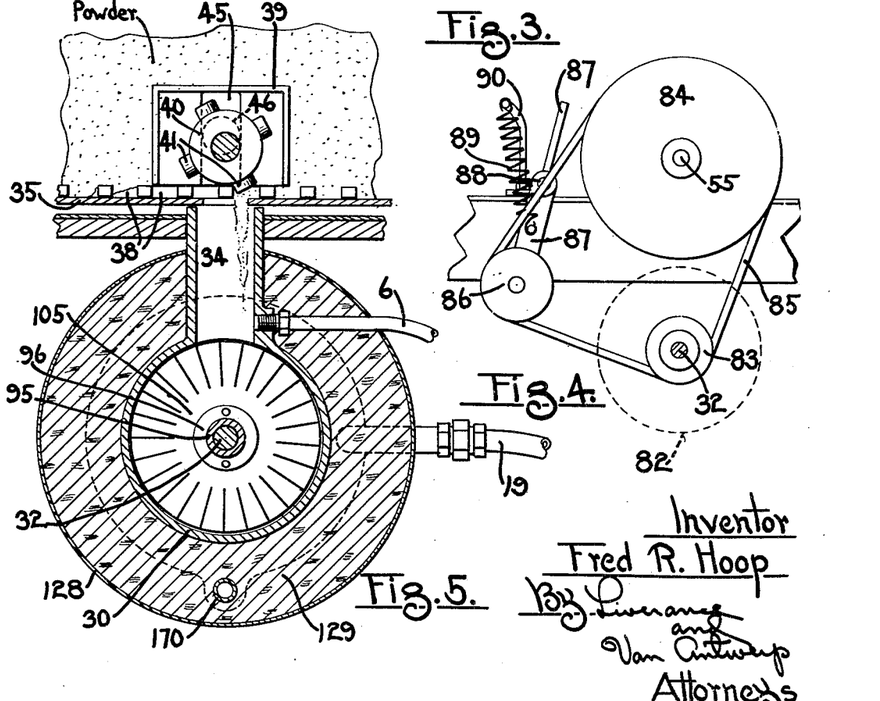
Fig. 4 is a fragmentary detail elevation illustrating part of the driving mechanism.
Fig. 5 is a sectional elevation on the line 5—5 of Fig. 6.

A motor 80 (Fig. 2) drives the drive shaft 32 of the cylinder 1 by means of a belt 81 passing over a pulley 82 fixed to the shaft 32. A pulley 83 is fixed to the shaft 32 and a pulley 84 is fixed to the pump shaft 55. A belt 85 passes around the pulleys 83 and 84 and also around an idler pulley 86 (Figs. 3 and 4) mounted on a lever 87 which is pivoted to the frame of the machine at 88. This lever can be manually moved from the position in which the idler 86 holds the belt tight to a position in which the idler loosens the belt so that it will not drive. A spring 89 anchored to a bracket 90 tends to hold the lever 87 in either of the positions to which it is moved. The object of the movable idler 86 is to release the belt so that operation of the shaft 32 will not drive the pump nor powder feeding mechanism during the time the machine is being cleaned at which time it is desired to rotate the mixing device in the cylinder 1.

Figures 6, 7:
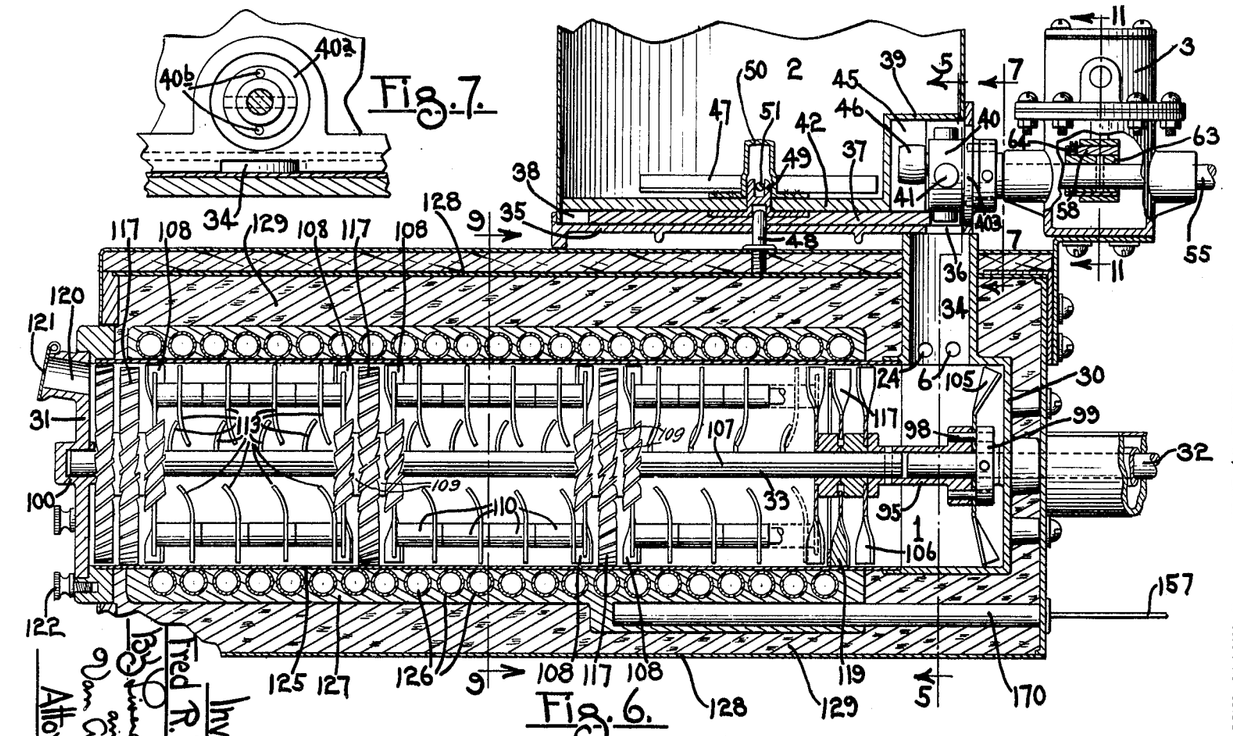
Fig. 6 is a sectional elevation through the axis of the freezing cylinder and ingredient feeding device.
Fig. 7 is a fragmentary sectional elevation on the line 7—7 of Fig. 6.

The mixer shaft 33 in the freezing cylinder 1 is provided on its inner end with a coupling member 95 (Figs. 6 and 8) having a central opening to receive the end of the drive shaft 32 and having a flange 96 with holes 97 therein to receive pins 98 extending from a coupling flange 99 fixed to the drive shaft 32. This provides a detachable coupling between the drive shaft 32 and the mixer shaft 33. The two shafts may be disconnected by merely drawing the shaft 33 endwise. The forward end of the shaft 33 has a journal bearing 100 in the front detachable head 31 of the cylinder.

A series of mixing and advancing and retarding devices are mounted on the mixer shaft 33, one of these, in the nature of a disk 105 having inclined blades being carried on the shaft 32 near the inner end of the cylinder and located between the coupling flanges 96 and 99 and having openings through which the pins 98 pass. Another similar disk 106 having inclined blades is mounted on the forward end of the coupling 95 and is removable with the shaft 33.

The shaft 33 has a spline 107 extending nearly its whole length. Three sets of mixing devices are provided which are removably mounted on the shaft 33 and caused to rotate therewith by the spline 107. Each of these sets of mixing devices has two spaced apart heads 108 and each head is provided with a hub 109, each hub having a central opening to receive the shaft 32 and a keyway 107a to receive the spline 107. The two spaced apart heads are connected by shafts 110 located near the peripheries of the shafts and having their respective ends fixed to said heads 108 (see Fig. 9). The heads 108 are preferably made of sheet metal and have inclined blades 111 spaced around their peripheries.

On each of the shafts 110 is a plurality of hubs 112 two each of which is connected a blade 113. The hubs 112 are rotatably mounted upon the shafts 110 and the blades 113 may swing. These blades are arc shaped and their outer peripheries coincide with the curvature of the interior of the cylinder 1. In operation the blades trail behind the shafts 110 as the mixer rotates and are moved outwardly in contact with the cylinder by centrifugal force. The blades are curved or inclined for the plane of rotation, some of the blades being inclined in the direction to advance the cylinder contents and others being oppositely inclined to retard the contents, for the purpose hereafter explained (see Figs. 6 and 9).

Figures 8, 9, 10, 11:
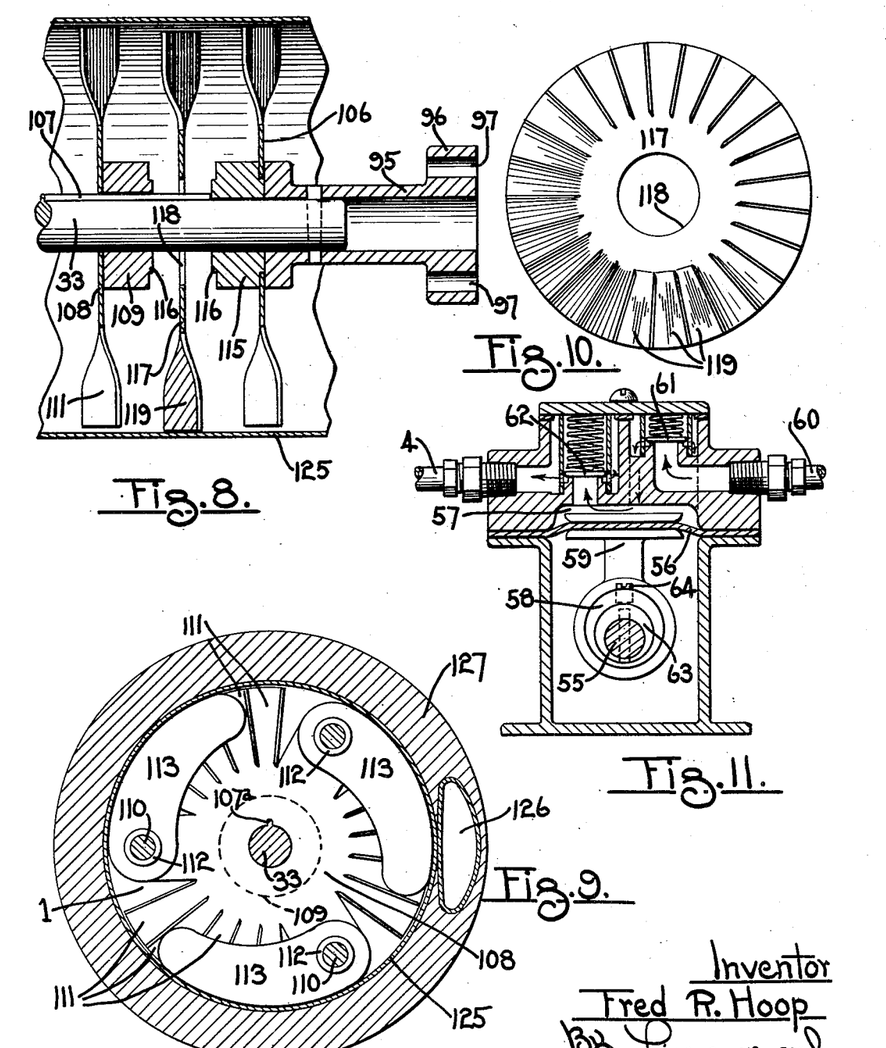
Fig. 8 is an enlarged fragmentary elevation, partly in section of the mixer shaft and blades in partly disassembled position.
Fig. 9 is a cross section of the freezing cylinder and mixer on the line 9—9 of Fig. 6.
Fig. 10 is a side view of one of the loosely mounted mixing disks.
Fig. 11 is a cross section of the water pump on the line 11—11 of Fig. 6.

Each of the hubs 109 as well as a collar 115 permanently fixed on the shaft 33 against the coupling 95 and holding the disk 106 in place, is provided with an extension 116 (see Fig. 8). The adjacent extensions 116 engage each other when the device is assembled and each abutting pair of extensions provides an annular groove in which is located a loose mixing disk 117 which has the central opening 118 considerably larger than the shaft and also larger than the diameter of the extensions 116 so that it may move laterally of the shaft when assembled. The loose mixing disks 117 are weighted at one side by weights 119 and when in operation these weights tend to move the disks downwardly into contact with the lower part of the cylinder and to prevent or retard their rotation. The blades of all the mixing disks 105, 106 and 117 and the blades of the heads 108 are all inclined in the same direction which serves to advance the contents of the cylinder from the inner end to the outer feed end thereof as they rotate but as before stated, the blades 113 are inclined some in one direction and some in the other so that some of them will advance the contents of the cylinder from the inner to the outer end while others act to retard or give reverse movement to the contents. Although the loose mixing disks 117 have their blades inclined in the same direction as the others the fact that they do not rotate or rotate more slowly than disks on each side of them breaks up the mixture and tends to retard its advance movement.

The action of the foregoing structure is to thoroughly mix and agitate the contents of the cylinder 1 as the mixing device is rotated. Some of the mixing devices advance the contents while others reverse or retard its flow with the result that the mixture is not only thoroughly mixed but also requires a longer time to pass from the entrance end of the cylinder to the outlet end. This length of time is most desirable because it is required that the contents be in the cylinder a certain length of time to be cooled to the desired extent before being drawn off for use.

In the head 31 is located an outlet spout 120 which has a hinged closure 121. This spout is preferably located at the upper side of the cylinder and it is found that rotation of the mixing device will carry the contents forwardly and upwardly and flow it out through the spout 120 when so located. The head 31 is held in place by screws 122 which when removed permit ready removal of the head and upon removal of the head the shaft 33 and all of the mixing devices may be withdrawn for cleaning.

The body of the cooling or freezing cylinder 1 comprises a shell 125 around which is coiled a cooling or expansion coil 126 of the refrigerating system. Surrounding this coil 126 and the shell 125 is cast a body 127 of good heat conductivity such as aluminum and this metal is therefore in intimate contact with the cooling coil 126 and the shell 125 and aids in heat conductivity. This whole cooling unit is preferably surrounded by a jacket 128 containing insulating material 129 which prevents entrance of heat from the exterior and improves the efficiency of the device.

Figure 13:
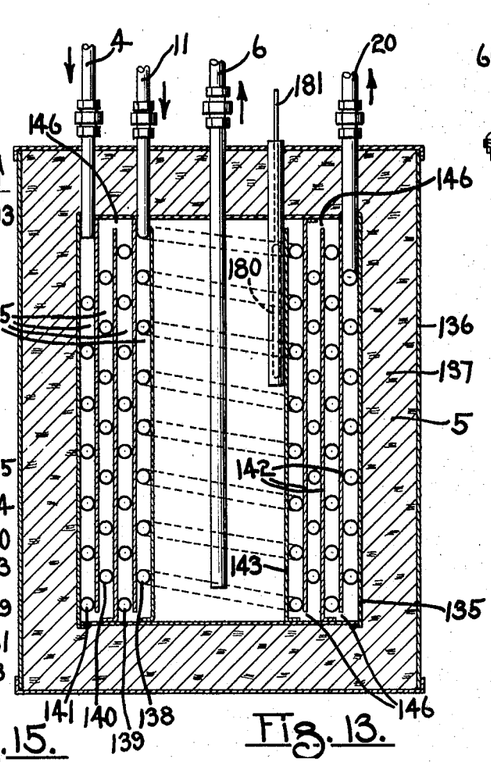
Fig. 13 is a sectional elevation of the water cooler on the line 13—13 of Fig. 14.
Figures 14, 15:
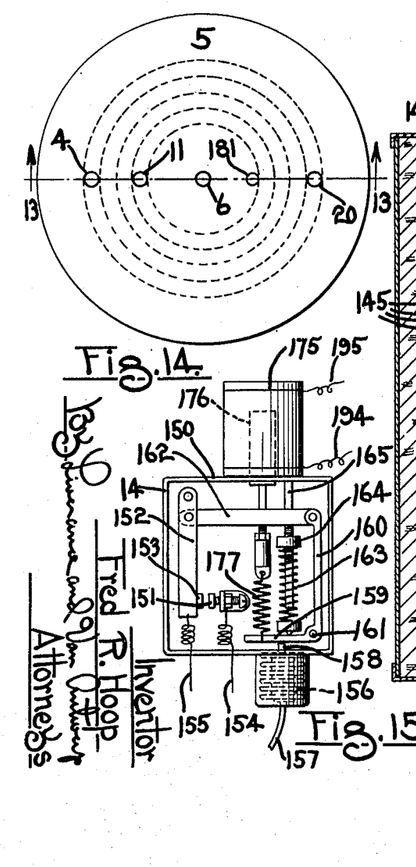
Fig. 14 is a plan view of the water cooler.
Fig. 15 is an elevation of one of the thermostatically operated switches with the cover removed.

The water cooler 5 is especially designed for efficient operation and comprises a tank surrounded by a jacket 136 containing insulating material 137. The cooling unit in the tank 135 comprises a series of helical pipe coils 138, 139, 140 and 141, each progressively surrounding the other and separated by cylindrical partitions 142. An inner cylinder 143 is also provided. The spaces between the respective partitions 142 and the inner cylinder 143 and the outside of the tank 135 therefore each contain a helical coil in contact with the walls of the cylinder and partitions thus forming helical passageways 145 between the pipe coils for the passage of water and the partitions and inner cylinder are provided with passageways 146 from one space to the other. The respective pipe coils are connected to each other so that a continuous flow of refrigerant is provided from the inlet pipe 11 to the outlet pipe 20.

For most efficient operation it is preferred to have the refrigerant enter through the pipe 11 into the inner coil 138 from which it passes successively through the coils 139, 140 to the outer coil 141 from where it is emitted through the pipe 20. The water is introduced to the outer space through the pipe 4 from where it follows its helical path following the coils of the pipe until it reaches the interior of the inner cylinder 143 from where it passes off through the pipe 6. By this means the warm water entering the cooler engages the outer refrigerating coil which has lost some of its refrigerating capacity and as the water progresses into the inner part of the cooler it progressively contacts cooler portions of the coils until it reaches the inner cylinder 143 from which it is drawn off and which cylinder is surrounded by the coil containing the incoming refrigerant and which is the coldest. In this way the water has reached its lowest temperature at the point from where it is drawn off.

The valves 15, 16 and 21 which control the flow of refrigerant are electrically operated and are closed when de-energized and opened when energized. The electric current to these valves is controlled by pressure operated switches 13, 14 and 23. The valves and switches are conventional and well understood by those skilled in the art excepting for an addition to the switch 14 hereafter described.

The switch 14 (Fig. 15) comprises a casing 150 in which is mounted a fixed electrical contact 151 and a pivoted lever 152 on which is the moving contact 153. Each of the contacts 151 and 153 is in electrical circuit with the conductors 154 and 155. A bellows 156 is mounted on the casing 150 and has a tube 157 communicating with its interior. A pin 158 is fixed to the movable end of the bellows and moves with expansion and contraction thereof.

A bell crank having arms 159 and 160 is pivoted at 161 and has its arm 159 engaged by the pin 158 and its arm 160 connected by a link 162 to the contact lever 152. A spring 163 presses downwardly upon the arm 159 and has its upper end seated upon a nut 164 adjustably mounted on a rod 165.

A bulb 170 (Figs. 2 and 6) is associated with the freezing cylinder 1 by being imbedded in the covering body 127 thereof and is in communication with the bellows 156 through the tube 157. The tube 157, the hub 170 and the bellows 156 contain fluid hermetically sealed therein which is expansible under increased temperature. Therefore increased temperature at the cylinder 1 expands the fluid in the bulb 170 and exerts pressure to expand the bellows 156 moving the bell crank 159 and 160. This movement is transmitted through the link 162 to the contact lever 152 moving the contact points 151 and 153 into engagement and closing the electric circuit. The spring 163 is placed under the proper tension so that a predetermined degree of heat at the freezing cylinder 1 will cause the spring 163 to become compressed sufficiently to contact the points 151 and 153 to close the circuit. This closing of the circuit opens the refrigerant valves 16 and 21 permitting compressed refrigerant to enter the coil 126 and evaporated refrigerant to pass from the coil through the pipe 19.

It is desired that the freezing cylinder 1 be cooled to a lower temperature while it is in operation than while it is idle and for that purpose a solenoid magnet having a coil 175 (Fig. 15) is provided on the switch 14. The movable core 176 of the magnet is connected by a spring 177 to the arm 159 of the bell crank. When the coil 175 is de-energized the spring 177 exerts no effort against the arm 159 but when the solenoid coil is energized and moves the core 176 upward the spring 177 is caused to exert an upward pull upon the arm 159 to partly counteract the opposite action of the spring 163 thereby requiring less pressure in the bellows 156 to move the bell crank and connecting parts to close the electric circuit. By this means the circuit will be closed to actuate the valves 16 and 21 at a lower temperature at the freezing cylinder 1 when the solenoid magnet 175 is energized.

Figure 1:
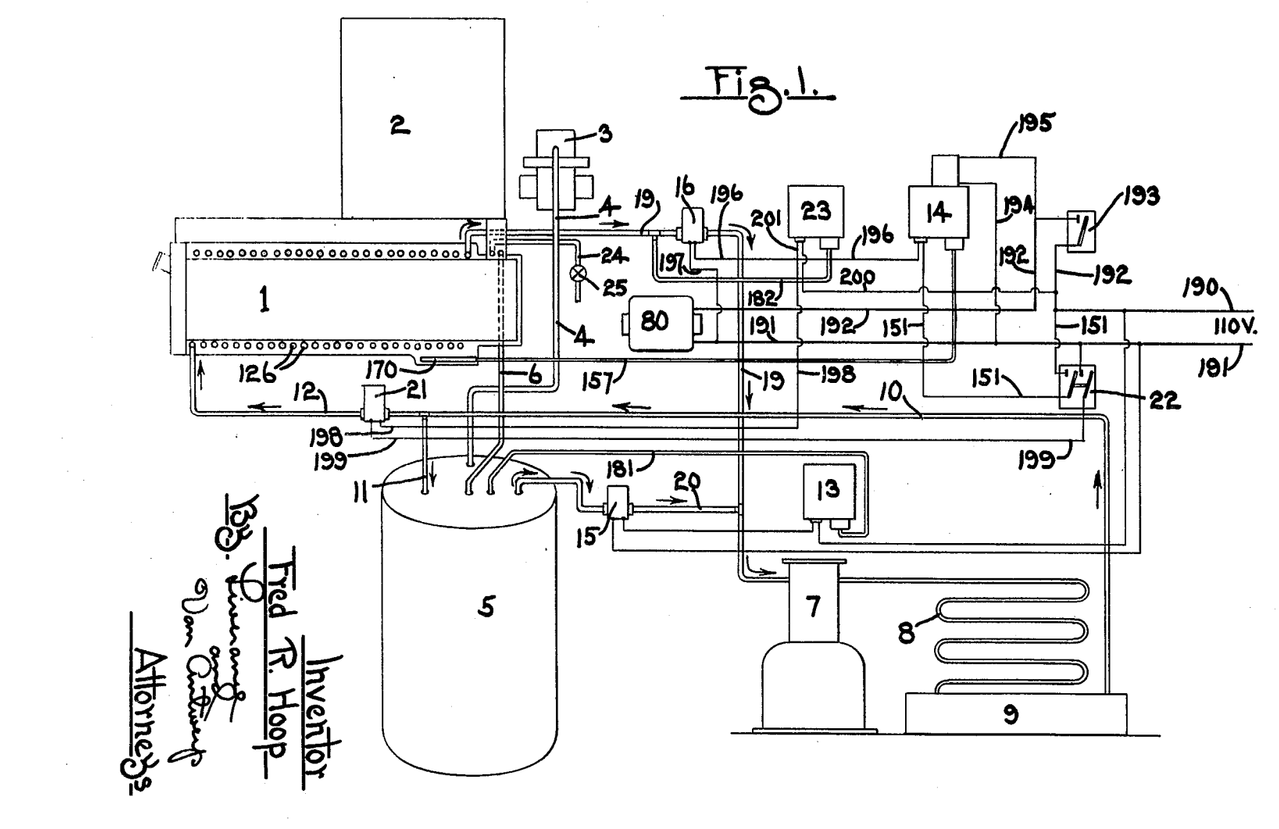
Fig. 1 is a diagram of the complete device showing the various parts in diagrammatic form.

The switch 13 (Fig. 1) is identical with the switch 14 excepting that it does not include the solenoid magnet and spring actuated thereby and does not have provision for opening and closing at different pressures in the bellows. This switch actuates the valve 15 which opens and closes the refrigerant outlet pipe 20 from the water cooler. It has been determined that the temperature can be controlled by opening and closing the outlet pipe only. A bulb 180 (Fig. 13) containing expansible fluid and connected by a tube 181 to the bellows of the switch 13 is located at a point where it will be readily affected by the temperature in the water cooler, as being immersed in the water therein.

The switch 23 actuating the valve 16 is identical with the switch 13 excepting that the pressure to actuate the bellows is derived from excessive refrigerant pressure in return pipe 19 with which the bellows of the switch 23 is directly connected by a tube 182.

The source of electric current to operate the motor 80 and the valves 15, 16 and 21 is through two conductors 190 and 191 which are connected with a suitable source of supply. The conductor 191 extends directly to the motor 80 while the conductor 190 is in communication with the motor by a conductor 192 through a manual switch 193. The solenoid magnet 175 obtains its current from the conductor 191 through a conductor 194 and is connected with the conductor 190 by a conductor 195 through the switch 193. Thereby it will be seen that when the motor is operated by closing the switch 193 the solenoid magnet of the switch 14 is also energized to attain the decreased temperature desired in the cylinder 1 during operation as explained. When the switch 193 is opened and the motor is stopped the solenoid magnet 175 is de-energized and the switch actuates under tension of the spring 163 only.

The switch 14 obtains its current from the conductor 190 through the conductor 151 in which is interposed one blade of the manual double pole switch 22. The current is delivered from the switch 14 through a conductor 196 to the valve 16 from where it passes through a conductor 197 to the conductor 191. The current is also delivered from the conductor 196 to a conductor 198 which joins the conductor 196 and which extends to the valve 21. The return connection from the valve 21 is through a conductor 199 and to the conductor 191 through one of the blades of the double pole switch 22 which is interposed between the conductor 199 and the conductor 191.

The pressure actuated switch 23 is interposed in the connection from the conductor 190 to the valves 16 and 21. A conductor 200 connects the conductor 190 to the switch 23 and a conductor 201 connects the switch 23 to the conductors 196 and 198 leading to the switches 16 and 21 from which switches connection is made respectively through the conductors 197 and 199 to the conductor 191.

The source of electric current for actuating the compressor 7 of the electric refrigerating system and the control thereof has not been shown or described inasmuch as this compressor and its operation are entirely conventional and well understood by those skilled in the art.

Operation

Assuming that the machine is in readiness for operation and provided with the proper electrical and water connections and with powder containing the desired ingredients in the hopper 2, the water cooler 5 and the freezing cylinder 1 have been cooled to their proper temperatures as controlled by their respective switches and refrigerant valves.

The water cooler 5 and its contents of water are maintained at the desired temperature under control of the thermostat bulb 180 within the cooler and the switch 13 which controls actuation of the valve 15 in the pipe 20 that returns expanded refrigerant from the cooler to the compressor. When the temperature within the cooler rises above the desired degree the valve 15 will be opened permitting vaporized refrigerant to pass from the coils in the cooler which permits compressed refrigerant to enter the coils and lower the temperature. For the product which has been manufactured with this machine the water in the cooler has been maintained at slightly above freezing temperature or approximately 34°. This temperature may be varied according to requirements but in most cases it will be desirable to have the water enter the freezing cylinder at as low a temperature as possible without freezing.

The freezing cylinder when idle, and for the product which has been made in this machine, is maintained at a temperature of about 26°. This temperature is under control of the thermostatic bulb 170 adjacent the cylinder and the switch 14. The switch 14 controls the refrigerant valves 16 and 21 simultaneously, the valve 21 being located in the compressed refrigerant feed pipe 12 while the valve 16 is in the expanded refrigerant return pipe 19. When the temperature in the freezing cylinder rises above the desired degree the switch will open both valves 16 and 21 which permits compressed refrigerant to enter the expansion coils 126 of the cylinder and expanded refrigerant to escape from the coils.

When it is desired to manufacture and dispense the product the manual electric switch 193 is closed. Closing this switch starts operation of the motor 80 and also energizes the solenoid magnet 175 of the switch 14 which acts to reduce the temperature in the cylinder at which the switch opens to about 24° as has been explained.

The operation of the motor 80 rotates the shafts 32 and 55. The shaft 55 is the water pump shaft which actuates the pump 3 and takes water in measured quantities from the chamber 65 delivering it to the water cooler and at the same time forcing an equal quantity of cold water from the cooler through the pipe 6 into the rear end of the freezing cylinder through the spout 34. At the same time the pump shaft 55 rotates the spur wheel 40 which turns the disk 37 bringing its notches 38 into register with the opening 36 in the bottom of the hopper and pushes the powder from the notches 38 through the opening 36 from where it falls through the spout 34 into the freezing cylinder and mixes with the water.

During rotation of the spur wheel 40 and the disk 37, the spoked wheel 47 is caused to rotate with the disk 37 keeping the powder stirred to avoid any caking or cavitating of it. The eccentrically mounted roller 46 turning in the vertical slot 45 of the housing 39, causes the housing and its attached agitator 42 to oscillate above the disk and further keep the powder agitated to assure that the notches 38 will be filled.

The shaft 32 rotates the mixing and feeding device mounted upon it within the cylinder. The inclined vanes on the disks 105 and 106 move the contents of the cylinder forwardly as do also the inclined vanes on the disk shaped heads 108. The loose disks 117 which either remain stationary or rotate more slowly than the disk 106 and the heads 108, between which they are located, tend to retard the advance movement of the contents of the cylinder, delaying its progress and resulting in more thorough mixture. The blades 113 rotate with their outer edges in contact with the cylinder wall and, being curved or inclined relative to the plane of rotation, some in one direction and some in the other direction, move the mixture forward and backward in the cylinder as they rotate which also delays advance of the contents and thoroughly mixes and aerates it. By this backward and forward movement of the cylinder contents it is retained in the cylinder a sufficient length of time and is repeatedly brought into contact with the cold cylinder wall so that when it finally reaches the outer delivery end of the cylinder it has obtained its proper consistency and coldness.

The mixer may be rotated more rapidly than the ordinary mixer of a conventional ice cream freezer because the forward and backward movement of the contents caused by the blades being inclined in different directions prevents the body of the mixture from attaining a high rotative speed which would tend to carry it through the machine too rapidly. This higher speed also maintains the mixture near the cylinder wall where it will cool more rapidly.

When the product reaches the outer end of the cylinder 1 it will be delivered from the spout 120 as the shaft 32 rotates. This delivery is caused because there is a somewhat greater action of the mixing and feeding devices to move the contents toward the delivery end of the machine than to move it in the opposite direction. Therefore when it is desired to dispense the product, after the machine has been operated sufficiently to manufacture the proper amount of contents in the cylinder, the operator merely opens the closure 121 over the spout 120 and closes the switch 193. This delivery of the product may continue for any desired time. The machine has been properly designed and proportioned so that if it is run constantly the powder and water entered at the rear of the cylinder will become completely mixed and cooled to the proper degree by the time they have reached the outlet end of the cylinder. On the other hand if it is only desired to draw off one or two glasses of the product the operation of the machine may be stopped after that has been done by opening the switch 193 which automatically permits the temperature of the cylinder contents to rise somewhat and the machine with its contents may be left idle for a long period and the contents preserved at the proper temperature therein and be immediately available for delivery when desired.

For sanitary purposes, and to meet the requirements of laws governing the operation and public use of machines of this nature, it is necessary to clean the machine at intervals. The hopper, including its bottom 35, may be removed simply by lifting it from the pin 48. In doing this the spur wheel 40 is removed from its driving connection with the shaft 55. The mixing wheel 47 and the agitator 42 and housing 39 and the feed disk 37 all lift out of place from the hopper for easy cleaning. These parts are reassembled in the same simple manner by simply placing them successively in their proper locations.

Before cleaning the cylinder its contents are removed by operation of the motor 80 and the shaft 32 but without feeding water or powder to the cylinder by rotation of the shaft 55. To accomplish this the lever 87 is moved to a position in which the idler pulley 86 will release the tension on the belt 85 so that rotation of the shaft 32 will not be transmitted to the shaft 55. By operation in this manner the greater part of the contents of the cylinder may be dispensed before cleaning and without waste.

After the bulk of the contents of the cylinder has been removed as above described, water is admitted through the pipe 24 by opening the valve 25 and the motor is operated to rotate the shaft 32 and the mixing devices upon the shaft 32 within the cylinder in the presence of water which will result in a preliminary cleaning or rinsing of the parts. While this cleaning is being done the manual switch 22 is opened which makes the switch 14 ineffective and also breaks the electric circuit to the valve 21 causing it to remain closed. Thus increased temperature in the cylinder 1, although it expands the fluid in the bulb 170, has no effect upon the operation of the valves 16 and 21 because the electric circuit to the switch 14 has been broken. However the compressed refrigerant which has been admitted to the expansion coil 120 previous to opening the switch 22 and thereby trapped between the valves 16 and 21 may expand and cause abnormal and dangerous pressure. To avoid this the switch 23, actuated by pressure in the return line ahead of the valve 16, will close upon attainment of such pressure causing the valve 16, which it controls, to open and relieve the pressure to the compressor 7. Inasmuch as the feed valve 21 is also in the same operating circuit as the return valve 16, and it is not desired to introduce more compressed refrigerant into the cylinder evaporator during the cleaning operation, the return circuit 199 of the valve 21 is broken upon opening the switch 22.

After the desired rinsing of the cylinder and the parts within it has been done the motor 80 is stopped and the outer cylinder head 31 removed by removing the screws 122. The shaft 32 and the parts upon it may then be pulled outwardly and removed from the cylinder and each individual part removed from the shaft and cleaned. The entire outer end of the cylinder having thus been opened its interior is easily accessible for recleaning. When the hopper has been removed from the upper end of the spout 34, the spout is accessible for cleaning. Reassembly of the parts is done simply by putting them together in the reverse manner from which they were disassembled.

Although the machine has been described as using the ingredients to be mixed with water in powder form, it is conceived that the ingredients may be introduced in liquid form in which case a different type of ingredients feeding device would be used but otherwise the machine would be the same and the spirit of the invention would be followed throughout.

The invention is defined in the appended claims and is to be considered comprehensive of all forms of structure coming within their scope.

I claim:

1. A machine of the class described comprising, a cooling chamber, means for mixing ingredients in and for delivering the finished product from said cooling chamber, power means for operating said mixing and delivering means, means for cooling said cooling chamber, control means for controlling the temperature of said cooling chamber including means for changing the temperature at which said cooling means will maintain the cooling chamber and a manually operated means controlling the said power means and said temperature control means, whereby the power means may be made to start or stop said mixing means and simultaneously the cooling means will be caused to raise or lower the temperature of said cooling chamber.

2. A machine of the class described comprising, a mixing and cooling chamber adapted to receive food ingredients to be chilled, mixed and aerated and having an inlet near one end and an outlet near its opposite end, cooling means operable to maintain said chamber at a substantially constant temperature, and a mixing and advancing device in said chamber comprising a rotatable shaft extending from a point near said inlet to a point near said outlet, a plurality of disks rotatably fixed to said shaft having vanes at their peripheries inclined in a direction relative to the rotation of said shaft to advance the contents of the chamber from said inlet to said outlet and disks surrounding said shaft and unconnected therefrom interposed between said first named disks, said unconnected disks also having inclined vanes at their peripheries.

3. The elements defined in claim 2 in which said unconnected disks are weighted at one side.

4. A machine for mixing and freezing food ingredients and delivering them as a smooth semi-frozen mass comprising a mixing and cooling chamber adapted to receive said food ingredients and having an inlet near one end and an outlet near its opposite end, cooling means encircling said chamber and comprising refrigerant coils in contact with the chamber wall, and a jacket of high heat conductivity metal filling the interstices between coils and uniting the coils with the chamber wall whereby to uniformly cool the chamber wall, and a mixing and advancing device in said chamber adapted to bring the food ingredients entering at said inlet progressively into contact with the chamber wall from the inlet end to the outlet end of the chamber, said device comprising a rotatable shaft extending from a point near said inlet to a point near said outlet, blade supports carried by said shaft and a plurality of blades pivotally mounted on said supports and extending therefrom in the direction opposite to the direction of rotation of said shaft whereby to press out against the chamber wall by centrifugal force, said blades having trailing portions extending out of the plane of rotation of the leading ends in a direction lengthwise of the shaft.

5. A machine for mixing and freezing food ingredients and delivering them as a smooth semi-frozen mass comprising a mixing and cooling chamber adapted to receive said food ingredients and having an inlet near one end and an outlet near its opposite end, cooling means encircling said chamber and comprising refrigerant coils in contact with the chamber wall, and a jacket of high heat conductivity metal filling the interstices between coils and uniting the coils with the chamber wall whereby to uniformly cool the chamber wall, and a mixing and advancing device in said chamber adapted to bring the food ingredients entering at said inlet progressively into contact with the chamber wall from the inlet end to the outlet end of the chamber, said device comprising a rotatable shaft extending from a point near said inlet to a point near said outlet, blade supports carried by said shaft and a plurality of blades pivotally mounted on said supports and extending therefrom in the direction opposite to the direction of rotation of said shaft whereby to press out against the chamber wall by centrifugal force, said blades having trailing portions extending out of the plane of rotation of the leading ends in a direction lengthwise of the shaft, some of said blades having the trailing portions thereof extending toward the inlet end of the chamber and other blades having the trailing portions thereof extending toward the outlet end of the chamber.

6. A machine for mixing and freezing food ingredients and delivering them as a smooth semi-frozen mass comprising a mixing and cooling chamber adapted to receive said food ingredients and having an inlet near one end and an outlet near its opposite end, cooling means encircling said chamber whereby to uniformly cool the chamber wall, and a mixing and advancing device in said chamber adapted to bring the food ingredients entering at said inlet progressively into contact with the chamber wall from the inlet end to the outlet end of the chamber, said device comprising a rotatable shaft extending from a point near said inlet to a point near said outlet, blade supports carried by said shaft and a plurality of blades pivotally mounted on said supports and extending therefrom in the direction opposite to the direction of rotation of said shaft whereby to press out against the chamber wall by centrifugal force, said blades having trailing portions extending out of the plane of rotation of the leading ends in a direction lengthwise of the shaft.

7. A machine for mixing and freezing food ingredients and delivering them as a smooth semi-frozen mass comprising a mixing and cooling chamber adapted to receive said food ingredients and having an inlet near one end and an outlet near its opposite end, cooling means encircling said chamber whereby to uniformly cool the chamber wall, and a mixing and advancing device in said chamber adapted to bring the food ingredients entering at said inlet progressively into contact with the chamber wall from the inlet end to the outlet end of the chamber, said device comprising a rotatable shaft extending from a point near said inlet to a point near said outlet, blade supports carried by said shaft and a plurality of blades pivotally mounted on said supports and extending therefrom in the direction opposite to the direction of rotation of said shaft whereby to press out against the chamber wall by centrifugal force, said blades having trailing portions extending out of the plane of rotation of the leading ends in a direction lengthwise of the shaft, some of said blades having the trailing portions thereof extending toward the inlet end of the chamber and other blades having the trailing portions thereof extending toward the outlet end of the chamber.

8. A machine of the class described, comprising a cooling chamber, means for agitating a beverage mixture therein and outlet means for the discharge of said mixture, power means for operating said agitating means, means for cooling said cooling chamber, and control means for said cooling means including a device to change the rate at which said cooling means will extract heat from said cooling chamber, and means to start and stop said mixing means operably connected with said rate changing device to cause its actuation.

9. A beverage compounding and delivering machine, comprising a cooling chamber, means for mixing ingredients in said cooling chamber, said chamber having an entrance for the ingredients and an outlet for the finished product, a powder measuring and delivering device operable to deliver a powdered ingredient into said entrance, a liquid measuring and delivering device operable to deliver a liquid ingredient into said entrance, power means driving said mixing means and said measuring and delivering devices, cooling means operable to keep the temperature of said chamber at either of two levels, and a control means for said power means and said cooling means operable to cause the cooling means to maintain the chamber at the lower temperature level only while the power means is operating.

10. A method of making and delivering a semi-frozen beverage which comprises repeatedly measuring unit quantities of a powdered ingredient and simultaneously measuring unit quantities of liquid, then bringing the measured quantities into a mixing chamber and continuously mixing, aerating and cooling the delivered powdered ingredient and liquid until a smooth semi-frozen consistency is reached, and delivering the finished product in a continuous stream.

11. A machine of the class described comprising, a mixing and cooling chamber adapted to receive food ingredients to be chilled, mixed and aerated and having an inlet near one end and an outlet near its opposite end, cooling means operable to maintain said chamber at a substantially constant temperature, and a mixing and advancing device in said chamber comprising a rotatable shaft extending from a point near said inlet to a point near said outlet, agitating and advancing members rotatably fixed to said shaft and agitating and retarding members on said shaft but not connected therewith interposed between said agitating and advancing members.

FRED R. HOOP.